Nov. 25, 1969   J. J. CORNISH III   3,480,234
METHOD AND APPARATUS FOR MODIFYING AIRFOIL FLUID FLOW
Filed Aug. 18, 1967   4 Sheets-Sheet 1
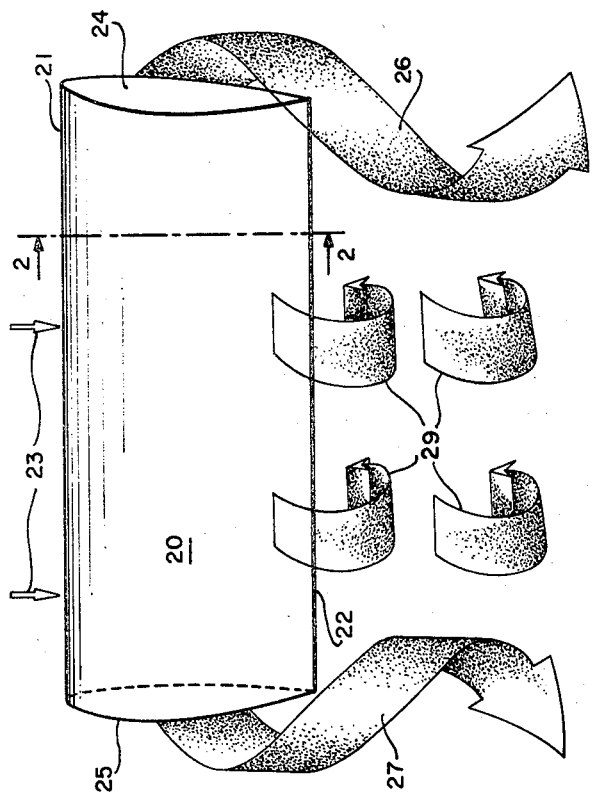
FIG_1
PRIOR ART
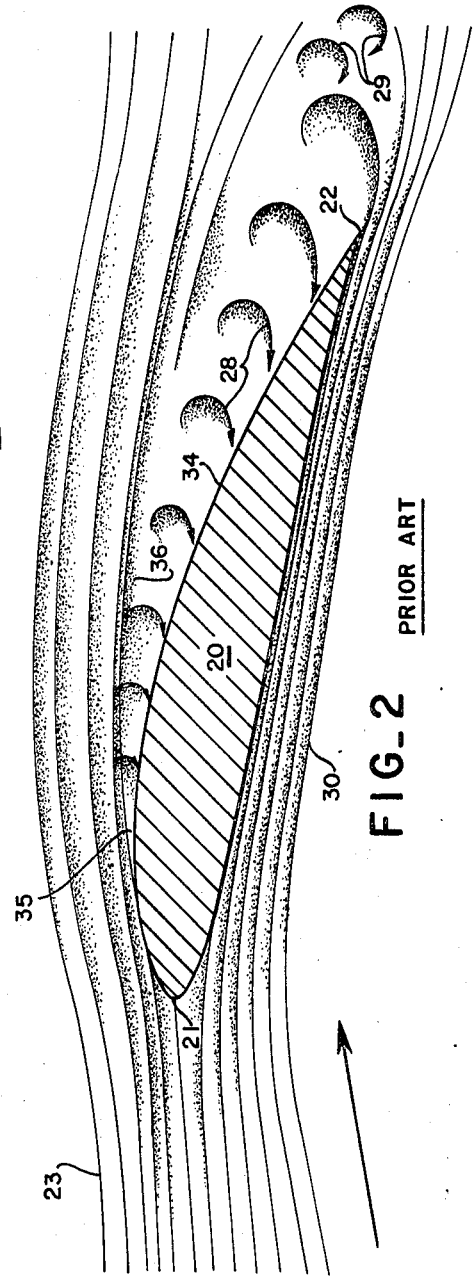
FIG_2  PRIOR ART
INVENTOR.
JOSEPH J. CORNISH, III
BY
Agent Nov. 25, 1969 J. J. CORNISH III 3,480,234
METHOD AND APPARATUS FOR MODIFYING AIRFOIL FLUID FLOW
Filed Aug. 18, 1967 4 Sheets-Sheet 2
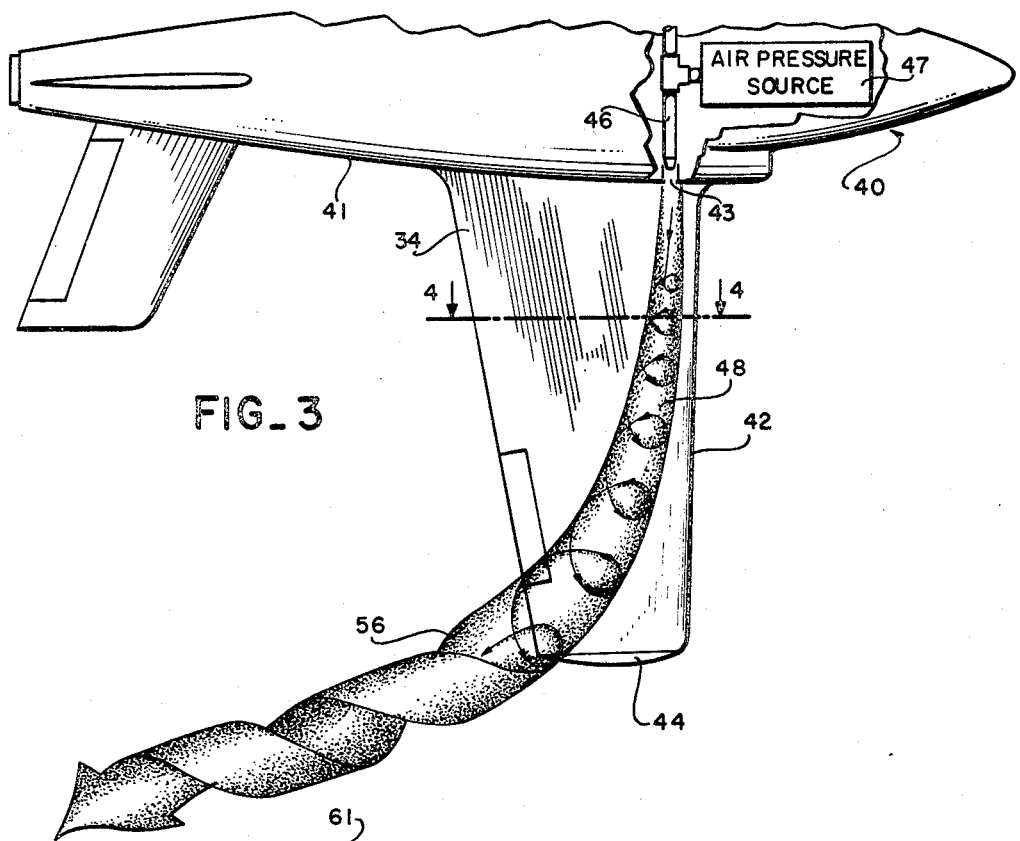
FIG_3
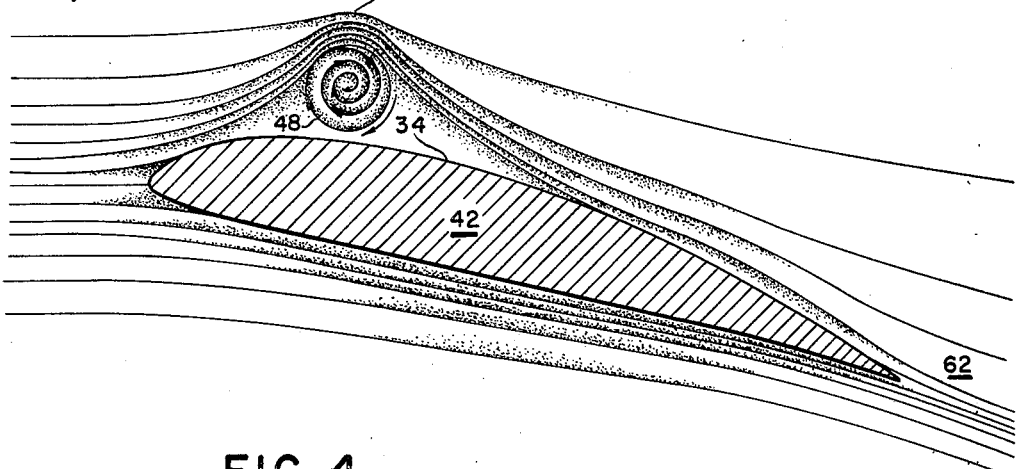
FIG_4
INVENTOR.
JOSEPH J. CORNISH, III
BY
Agent Nov. 25, 1969   J. J. CORNISH III   3,480,234
METHOD AND APPARATUS FOR MODIFYING AIRFOIL FLUID FLOW
Filed Aug. 18, 1967   4 Sheets-Sheet 3
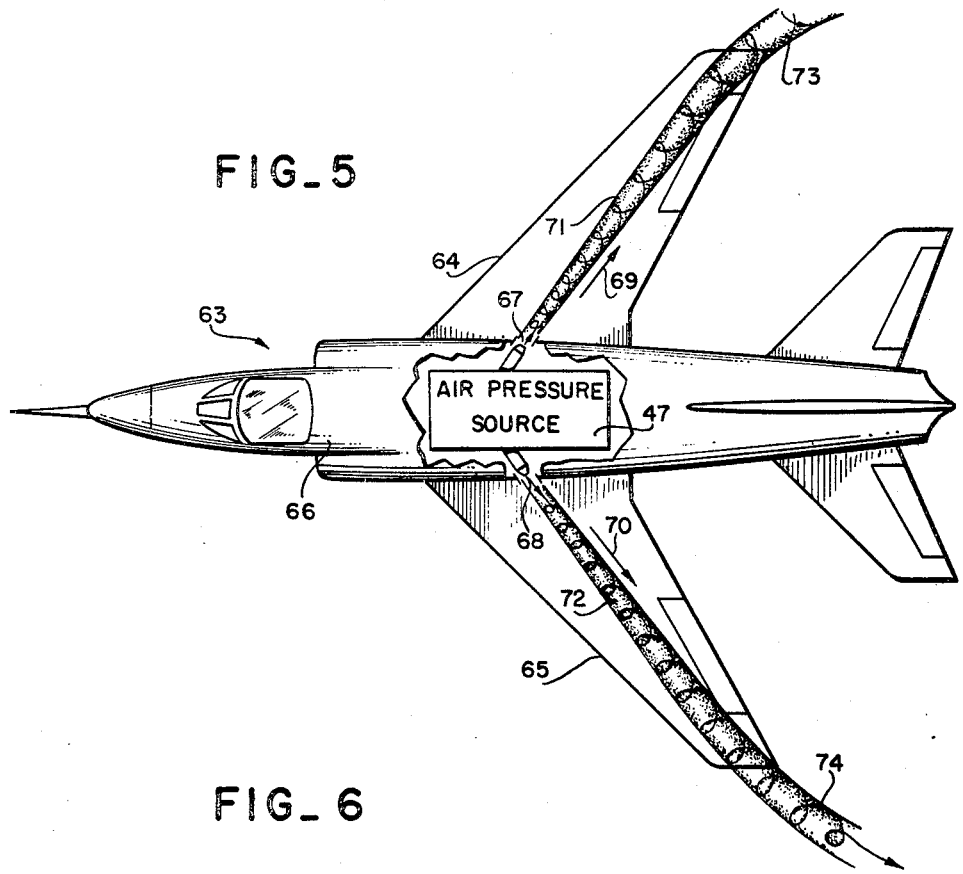
FIG_5
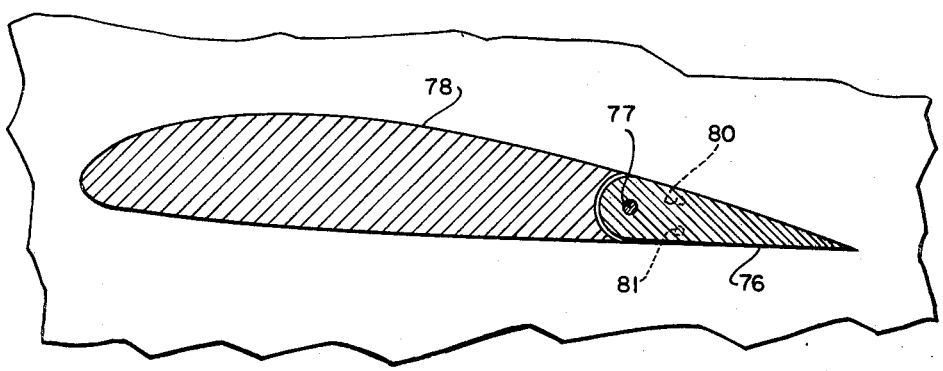
FIG_6
*INVENTOR.*
JOSEPH J. CORNISH, III
BY
Agent

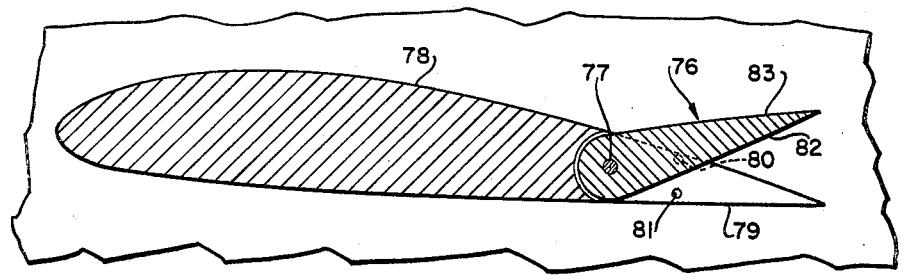
FIG_7
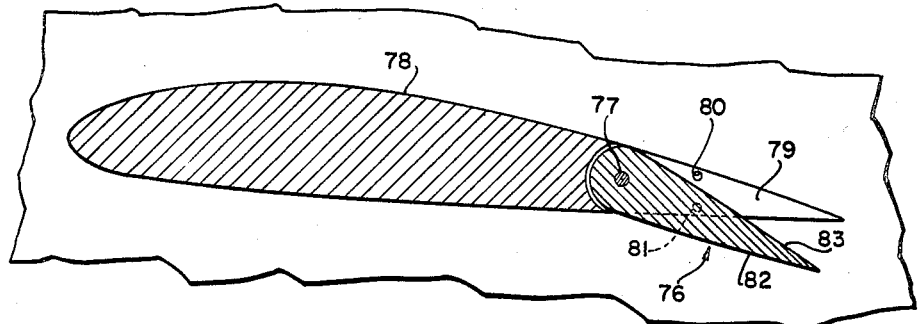
FIG_8
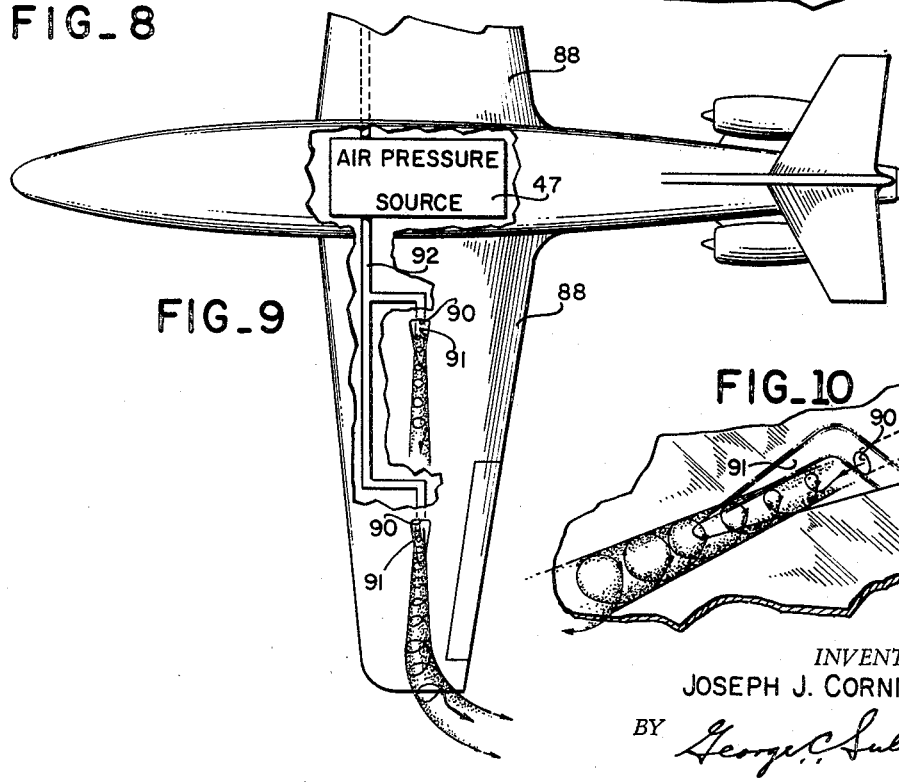
FIG_9
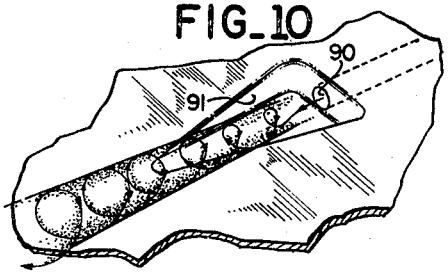
FIG_10
INVENTOR.
JOSEPH J. CORNISH, III
BY George C. Sullivan
Agent United States Patent Office 3,480,234
Patented Nov. 25, 1969

3,480,234
METHOD AND APPARATUS FOR MODIFYING AIRFOIL FLUID FLOW
Joseph J. Cornish III, Marietta, Ga., assignor to Lockheed Aircraft Corporation, Los Angeles, Calif.
Filed Aug. 18, 1967, Ser. No. 661,646
Int. Cl. B64c 3/00
U.S. Cl. 244—40                              12 Claims

ABSTRACT OF THE DISCLOSURE

A technique for preventing or controlling the occurrence of flow separation from the surface of an airfoil such as an aircraft wing. A jet of fluid is blown across the airfoil surface in a spanwise direction to entrain air adjacent the path of the jet. The movement of the blown fluid and entrained air in combination with the oncoming airflow establishes a vortex which is locked in position along the spanwise dimension of the airfoil. The oncoming airflow flows over the locked vortex and then becomes reattached to the airfoil surface, thereby preventing or delaying the occurrence of flow separation.

---

This invention relates in general to fluid flow and in particular to a method and apparatus for modifying the airflow across an airfoil to control airflow separation from the airfoil.

The term airfoil as used in this specification designates shapes that are used in vehicles such as aircraft or the like for sustentation and control. Such aircraft components as wings, movable control members, and stabilizers, by way of example only, are deemed to be airfoils as the term is used herein.

An airfoil such as an aircraft wing develops a lift force as a result of air movement across generally opposite sides or surfaces of the airfoil at unequal velocities. In the typical case of an aircraft wing, for example, air moves across the upper wing surface at a greater velocity than across the lower wing surface, thus producing a differential pressure on the wing which generates a net upward lift force thereon. The amount of differential pressure and consequently the amount of lift developed by a wing generally is dependent upon the difference in velocities of air movement across the opposed wing surfaces, and the relatively greater velocity of air movement across a wing upper surface relative to the wing lower surface commonly is obtained by appropriately forming the camber of the wing upper surface with respect to the lower surface.

Under certain conditions of aircraft operation, the relatively streamlined airflow across the upper surface of the wing tends to become partially or substantially completely separated from the wing upper surface. This flow separation typically occurs with an aircraft wing at relatively low flying speeds found, for example, at landing or takeoff conditions when the wing is being operated at a relatively high angle of attack and when maximum lift generation is particularly critical. The occurrence of flow separation from the wings or the control surfaces also may be critical for V/STOL aircraft operating in the region of transition between vertical and horizontal flight. With relatively thin wings of the type frequenty found on high-performance aircraft, this flow separation may occur almost instantaneously with catastrophic results if the pilot lacks sufficient altitude or otherwise is unable to correct the condition of stall caused by the loss of lift resulting from flow separation from the wing upper surface.

A further adverse effect resulting from flow separation from the wing upper surface is the increase in pressure drag resulting from the area of separated flow along the wing upper surface.

Another aspect of aircraft performance involves the vortex developed at each wing tip as the wing passes through the air. These tip vortices are formed generally curling or rolling upwardly from the bottom of each wing tip to the top of the tip, and these vortices trail each tip of the wing in a generally helical path in the wake of the tip movement through the air. The naturally occurring direction of rotation of the tip vortices produces an air downwash downstream of the wing, and this downwash contributes to the wing a drag force known as induced drag.

In addition to the induced drag, the wing tip vortices produce another effect detrimental to the performance of an aircraft. It can be observed that the tip vortices at their region of formation roll up around the wing tips or otherwise exist some distance inwardly of the actual wing tips, so that the separation distance between the two tip vortices is less than the actual geometrical wing span. Because the existence of the tip vortices inwardly of the wing tips is detrimental to lift-producing airflow across the wing at the tip regions thereof, the effective span of the wing accordingly is shorter than the geometrical wing span. The result of this decrease in effective wing span, other factors being equal, is a decrease in the lift produced by the wing.

Various prior art techniques have been proposed to prevent or postpone the occurrence of flow separation from the wing and thus to increase the lift of the wing. For example, it has been proposed to equip an airfoil such as a wing with one or more openings in the region of occurrence along the wing upper surface of relatively slowly moving boundary layer air, so that a suitable pumping device connected to such openings can withdraw some of the boundary layer air through suitable ducting in the airfoil and dispose of this withdrawn air at some other region. Such removal of a portion of the relatively slowly moving boundary layer air may delay or prevent the occurrence of airflow separation. This proposal, however, has the obvious disadvantages of requiring the necessary ducting and porting within and on the wing, as well as requiring a substantial amount of power for providing the necessary pumping action. Since the wing must contain the aforementioned ducting as well as the structural members, control linkages, and the other elements normally present in the wing, a practical wing constructed according to this prior art proposal generally cannot attain the desired degree of thinness required for certain other aerodynamic considerations.

Accordingly, it is an object of this invention to provide an improved method and apparatus for enhancing airfoil fluid flow.

It is another object of this invention to provide a method and apparatus for preventing or postponing the occurrence of lift-diminishing airflow separation from an airfoil surface.

It is another object of this invention to provide a method and apparatus for causing reattachment of airfoil separated airflow to an airfoil surface.

It is yet another object of this invention to provide a method and apparatus for increasing the lift of an airfoil.

It is a further object of this invention to provide an improved method and apparatus for enabling an airfoil to develop enhanced lift under conditions of high angle of attack and/or relatively low airspeed.

It is still another object of this invention to provide a method and apparatus for decreasing the pressure drag on an airfoil.

It is a further object of this invention to provide a method and apparatus for reducing the induced drag of an airfoil resulting from the generation of tip vortices It is still another object of this invention to provide a method and apparatus for increasing the effective span of an airfoil as affected by tip vortex condition present adjacent the ends of the airfoil.

It is yet another object of this invention to provide a method and apparatus for selectively varying the effective camber of an airfoil surface.

Stated generally, the technique of this invention comprises establishing a locked vortex adjacent at least a portion of an airfoil surface by directing a stream of a fluid such as air or the like along the airfoil in a spanwise direction and toward an outer end or tip of the airfoil. The vortex thus established functions to cause airflow across the airfoil surface to remain attached thereto or, if the airflow separates from the surface, for such airflow to become reattached to the surface. As applied to an aircraft wing, by way of example, an air stream emanates adjacent the fuselage on each side thereof and is directed along the upper surface of each wing half toward the respective wing tip. These air streams are directed so that the momentum of the air streams causes entrainment of some of the air present along the upper surface of the wing, with the result that this mixture of blown air and entrained air flows spanwise along the wing to depart the wing at an outer spanwise portion thereof. The presence of this spanwise airflow in conjunction with the airflow normally occurring over the wing surface causes a vortex to be established which is locked to the blown surface of the wing, and this locked vortex functions to cause reattachment of wing airflow which otherwise would separate from the wing surface and would remain separated. Moreover, the momentum of the aforementioned spanwise airflow, if sufficiently strong, can cause the tip vortices to be deflected outwardly in the air stream sufficiently to reduced the induced drag of the wing and also to enhance the effective span of the wing. An additional benefit derived from wing blowing according to the present invention is an increase in the effective camber of the blown airfoil surface caused by the establishment and maintenance of the locked vortex thereacross.

The exact nature of this invention as well as other objects and advantages thereof will be readily apparent on consideration of the following specification relating to the annexed drawings.

FIGURE 1 shows a view of a basic airfoil such as an aircraft wing without the application of the present invention and as seen from above in plan view, depicting tip vortices and other patterns of airflow generated by the passage of the airfoil through the surrounding air;

FIGURE 2 shows a section view taken along line 2—2 of FIGURE 1 and further illustrating some of the representative airflow patterns generated by an airfoil such as an aircraft wing under stall conditions and without the application of the present invention;

FIGURE 3 shows a partial plan view of an aircraft equipped according to an embodiment of the present invention;

FIGURE 4 shows a section view taken along line 4—4 of FIGURE 3;

FIGURE 5 shows a plan view of a swept wing aircraft equipped according to an embodiment of the present invention;

FIGURE 6 shows an elevational section view of an aircraft control member equipped according to another embodiment of the present invention, with the movable control member depicted in substantially a neutral position;

FIGURE 7 shows the control airfoil of FIGURE 6 with the movable control member positioned in a first direction displaced from the neutral position.

FIGURE 8 shows the control airfoil of FIGURE 6 with the movable control member displaced from the neutral position in a direction opposite to that depicted in FIGURE 7;

FIGURE 9 shows a partial plan view of an aircraft equipped according to still another embodiment of the present invention; and FIGURE 10 shows an enlarged pictorial view of a portion of the embodiment depicted in FIGURE 9.

Except where specifically stated otherwise, the following description is taken with respect to an airfoil used as an aircraft wing, although it will be evident to those skilled in the art that the subject matter described herein is applicable to airfoils generally.

FIGURE 1 shows a generally conventional wing 20 having a leading edge 21 and a trailing edge 22. Wing 20 is depicted as being in motion relative to the surrounding air, this motion being indicated schematically by arrows 23. As explained above, this relative movement generates at wing tips 24 and 25 respective tip vortices 26 and 27; it can be seen that these tip vortices roll around the wing tips from the lower side of the wing onto the upper side of the tip and the wing regions adjacent and inboard of the tips to disturb the streamline airflow otherwise occurring across the wing.

The flow of air over airfoil or wing 20 is also depicted in FIGURE 2, wherein this wing is at a positive angle of attack with respect to the oncoming air 23. It can be seen that air flow at 30 along the underside of the wing is generally streamlined with little or no air turbulence. The portion of the oncoming airflow 23 which flows over the upper surface 34 of the wing is depicted in FIGURE 2 as separating from the upper surface adjacent the leading edge 21 of the wing at 35, this situation indicating that the wing 20 is stalled. The separated airflow at 36 over the upper surface 34 of the airfoil 20 gives rise to a region 28 of turbulent air movement adjacent the upper surface and a corresponding turbulent wake 29 downstream of the wing. The location along the chord dimension of the wing of the point of separation 35 of the airflow from the wing surface is dependent, among other things, upon the angle of attack of the wing, with the point of separation generally moving toward the leading edge 21 as the angle of attack increases.

Airflow separation and resultant stall of the wing occurs almost instantaneously for aircraft having relatively thin wings; with aircraft having a wing presenting less severe stall characteristics, the presence of an incipient stall condition limits the angle of attack of the wing and the maximum lift of the aircraft. Accordingly, it can be seen that during landing, takeoff, or other maneuvers wherein an aircraft is traveling relatively slowly and at a relatively high angle of attack to develop the necessary lift, the problems and hazards associated with airflow separation are particularly severe.

According to the present invention, it has been determined that a blown stream of air or other fluid directed in a generally spanwise direction across an airfoil such as an aircraft wing and along the airfoil region whereat airflow separation can be expected to occur causes entrainment of a portion of the air flowing over the airfoil and causes the entrained air to move in a spanwise direction along with the blown fluid. This spanwise flow, comprising the blown air and the entrained air, causes formation of a vortex having an axis or core which is substantially coaxial with the spanwise flow and which remains substantially locked in position relative to the airfoil surface. This locked vortex rotates in a direction to cause the main chordwise airflow over the wing to flow above the locked vortex and then to be deflected downward to become reattached to the upper surface of the wing aft of the vortex.

The spanwise flow passes from the wing into the wake at a location or region generally situated near the wing tips, depending on the momentum of the entraining fluid stream. If this momentum is sufficient the spanwise flow causes the tip vortices to be deflected or otherwise displaced outwardly of their customary location, thereby enhancing the effective wing span and lessening the induced drag attributable to the tip vortices.

In the embodiment depicted in FIGURE 3 there is shown an aircraft indicated generally at 40 and having a fuselage 41 and a wing 42 extending from the fuselage. At a location generally above the upper wing surface 34 and intermediate the chordwise wing dimension is an orifice 43 mounted substantially flush with the fuselage exterior skin and directed to cause airflow along the wing in a generally spanwise direction toward the wing tip 44, it being understood that a corresponding arrangement of orifice 43 and wing is present on the left side of the aircraft, not depicted in FIGURE 3. Each of the orifices 43 is connected through a conduit 46 to a suitable air pressure source 47, it being understood that while air is referred to herein as conveniently available fluid, any other available gaseous fluid having an appropriate mass would suffice.

The air pressure source 47 can be any suitable device or apparatus which provides air having sufficient momentum to provide the degree of air entrainment and airflow control desired in a particular application. By way of a more specific example, the air pressure source 47 as embodied in a turbine powered aircraft may comprise suitable ducting and valving for bleeding air from one or more of the compressor stages of the aircraft engine or engines. Alternatively, air pressure source 47 could comprise an auxiliary gas turbine power unit either having the exhaust thereof directed to orifices 43 or being operatively coupled to a suitable air compressor to produce compressed air for supply to the orifices. Other examples of a suitable air pressure source 47 will present themselves to those skilled in the art.

The effect of the fluid streams directed from orifices 43 in a spanwise direction toward the wing tip 44 is depicted in FIGURE 3, wherein is shown an exemplary locked vortex 48 extending in a generally spanwise direction across the wing and including the fluid blown from orifice 43 as well as the air entrained by the blown fluid. It should be noted that the choice of a single orifice 43 on each side of the fuselage is by way of example only, inasmuch as either one orifice or a plurality of orifices on each side could as well have been used, depending on the requirements of a particular application. Similarly, the depicted showing of a single vortex 48 moving in the spanwise direction across wing 42 is only an exemplary diagrammatic representation of the effects of this invention and is not intended as a limitation of the results or operation thereof.

The air making up the locked vortex 48 moves in a spanwise direction toward the respective wing tips as a result of the momentum of the entraining fluid emanating from orifices 43. If the momentum and velocity of the air exiting from orifice 43 are great enough, then the vortex 48 is carried along the span of the wing to flow off the wing at or adjacent the tip 44 thereof, this being depicted in FIGURE 3 at 56 where the spanwise airflow of vortex 48, as it exits the wing upper surface 34 in the vicinity of the wing tip 44, combines with the conventional tip vortex found at the wing tip. The spanwise airflow there is entraining or otherwise affecting the tip vortex sufficiently to cause deflection or displacement of the tip vortex outwardly, as shown at 60, from its normal position at or slightly inboard of the wing tip. It can be seen, accordingly, that the effective span between displaced tip vortex 56 and the correspondingly displaced tip vortex (not shown) of the left wing of aircraft 40 is greater than the actual geometric span of the aircraft wing.

The significance of this increase in effective wing span can be realized by recalling that the induced drag on a wing resulting from downwash produced by the tip vortices is inversely proportional to the effective wing span, and so this induced drag is diminished as the effective wing span is increased. Moreover, since the lift produced by the wing also is dependent upon the effective wing span, increasing this effective span also increases the lift of the wing.

The effects of airflow control by blowing according to the present invention additionally are shown in FIGURE 4. In contrast to the prior art situation exemplified by the airflow conditions depicted in FIGURE 2, the locked vortex 48 established along the spanwise direction of wing 42 (in a direction into FIGURE 4 and away from a viewer of this figure causes lift-producing streamline airflow to pass, as indicated at 61, over the upper surface of the wing, over the locked vortex, and then to become reattached to the wing surface 34. The airflow then leaves the wing upper surface in a generally streamline manner as indicated at 62, in contrast to the turbulent wake 29 depicted in FIGURE 2 as arising from the region of separated flow.

At least three beneficial effects may be noted for the invention as described thus far. First, the wing can develop usable lift at angles of attack which would be prohibitively great without the practice of the present invention, since lift-producing airflow over the wing flows over the locked vortex and then undergoes reattachment to the wing surface. Second, the pressure drag on the wing is reduced in the situation depicted in FIGURE 4, as compared with the prior art situation depicted in FIGURE 2, since the region 28 of generally turbulent air resulting from airflow separation is replaced by the relatively higher pressure streamlined airflow over the aft section of the wing upper surface resulting from reattachment of the airflow. Third, and as depicted in FIGURE 4, the presence of the locked vortex 48 along the wing upper surface 34 causes airflow to occur at 61 as though the camber of this surface were significantly increased relative to the physical camber of the surface. This increase in effective wing camber thus enhances the lift produced by the wing while it is being blown according to the present invention.

In addition to being useful on straight wing aircraft, the present invention also can be applied to aircraft having swept wings as shown in FIGURE 5. There, an aircraft indicated generally at 63 has wing segments 64 and 65 swept back with respect to fuselage 66. An orifice 67 is positioned in the fuselage to direct a stream of air along wing segment 64, while a corresponding orifice 68 is positioned on the left side of the fuselage to direct an air stream along wing segment 65. A suitable air pressure source 47 is connected to each of orifices 67 and 68, it being understood that this air pressure source may be as described with reference to FIGURE 3.

Each of orifices 67 and 68 is aligned such that the air stream emanating therefrom is generally parallel to the wing axis as indicated by arrows 69 and 70. The momentum of the airflow from the orifices 67 and 68 entrains a portion of the air flowing over the wing upper surface to establish locked vortices 71 and 72 for causing airflow reattachment, as described above. If the momentum of the airflow across the wing is sufficient, the tip vortices 73 and 74 also are deflected or displaced outwardly.

It is known that swept wings have beneficial effects at air speeds approaching and exceeding Mach I. At lower speeds found at takeoff, landing, and similar maneuvers, however, the reduced lift of the swept wing must be countered, for example, by an increased angle of attack. Application of the present invention to swept wing aircraft, therefore, is particularly useful to enhance the available lift and for the other reasons set forth herein.

Although the discussion of the present invention set forth above is taken primarily with respect to aircraft wings, the control and locking of a vortex to an airfoil surface to reduce or prevent flow separation and generally to enhance the performance of the airfoil is applicable as well to such airfoils as aircraft control members. Turning to FIGURES 6, 7, and 8, there is seen a movable control member 76 pivotally attached at 77 for limited angular movement relative to a fixed airfoil 78. By way of example, fixed airfoil 78 could be a horizontal stabilizer of an aircraft, while control member 76 could be the elevator normally associated with the horizontal stabilizer.

Positioned on a portion 79 of fixed member 78 against which an end of the control member 76 moves are a pair of orifices 80 and 81, with these orifices each being connected to a suitable air pressure source (not shown). Orifices 80 and 81 are positioned with respect to the cross-section area of the control member 76 such that, when this control member is in a generally neutral position between defined extremes of movement, as depicted in FIGURE 6, both of the orifices are substantially blocked by the movable control member so that no air from either of the orifices can be directed over a surface of the control member.

When the control member 76 is moved as shown in FIGURE 7 to a first control position, orifice 81 is uncovered so that this orifice now is permitted to direct an airflow across the first surface 82. This airflow functions as described above to entrain some of the air flowing over the first surface and to establish a locked vortex in a generally spanwise direction along the first surface 82 of control member 76, so that airflow separation from this surface is prevented or delayed. The net effect, therefore, is an increase in the force generated on the control member 76, and thus on the aircraft, as a result of a given amount of angular control member deflection from the assumed neutral position depicted in FIGURE 6.

It can be seen that movement of the control member 76 in the opposite direction as depicted in FIGURE 8 causes orifice 81 to remain blocked while uncovering orifice 80. Since at this time the air velocity over surface 83 is greater than that over surface 82, airflow control relative to surface 83 is effected by the airflow emanating from orifice 80 and blowing generally across this surface of the control member.

It can be seen, accordingly, that the technique of this invention is applicable to such aircraft control surfaces as elevators, rudders, ailerons and the like as well as to aircraft wings. The orifice control disclosed herein, comprising blocking and unblocking of selected orifices by control member movement, is by way of example only inasmuch as such orifice control could be obtained by other techniques such as a separate valving arrangement under the control of the pilot either directly or through the control member actuating mechanism.

In the embodiments of the present invention described thus far, the airflow being directed across the wing has emanated from an opening depicted as being on the fuselage and appropriately positioned with respect to the wing upper surface. The actual physical location of the source of blown air, however, is secondary so long as the locked vortex resulting from the spanwise flow is established downstream of the location whereat airflow separation would occur without the present invention. Accordingly, one or more orifices could be contained in the upper surface of the wing in a relatively recessed position as shown in FIGURES 9 and 10. For example, an aircraft having a wing 88 could have one or more orifices 90 disposed on the upper surface of the wing in the recesses 91 to avoid projections upwardly from the wing into the airstream flowing thereover. The orifices 90 are connected by conduit 92 to a suitable air pressure source 47 as described above. Although orifices 90 may be unable to produce an airflow entirely parallel to the wing upper surface because of the recessed position of the orifices relative to this surface, the directive qualities of the orifices should be chosen such that the component of the airflow emanating therefrom parallel to the wing surface is maximized.

Although the embodiment depicted in FIGURES 9 and 10 has the disadvantage that the conduit 92 must be received within the thickness of the wing, a requirement not present in the other embodiments disclosed herein, this embodiment nonetheless has the advantage that the velocity of air supplied to each of the one or more orifices 90 situated at spaced apart locations along the wing span may have a velocity less than that required of a single fuselage-mounted orifice as depicted in FIGURES 3 and 5 to produce the same degree of airflow control. This advantage of the embodiment depicted in FIGURES 9 and 10 may be particularly worthwhile in the case of aircraft having a relatively long wing which, incidentally, would be more likely to have sufficient thickness to permit the installation of the required conduit 92.

As a further alternative to the recessed orifices of FIGURES 9 and 10, one or more orifices or nozzles could be provided which are completely concealed within the wing during non-use of the present invention and which emerge from the wing in response to a suitable control signal when needed to establish and direct a spanwise airflow. Since such apparatus would be used primarily at conditions of relatively low airspeed and relatively high angles of attack, any aerodynamic drag caused by the presence of one or more nozzle members extending above the wing surface would have little or no significant effect on the operation of the aircraft. During cruise conditions, however, such nozzle members would be completely retracted within the wing so as to eliminate any aerodynamic drag resulting, for example, from the recesses 91 shown in FIGURES 9 and 10.

Although the foregoing description of the disclosed embodiments of the present invention is directed to airfoils such as control members or fixed wings, this invention is also applicable to rotary wing aircraft such as helicopters or the like. The rotor blades of a helicopter are airfoils, and these blades can be subject to blowing for airflow separation control as described herein, with exemplary beneficial results being that a given amount of lift is obtainable with shorter rotor blades and that the problem of rotor blade tip stall is lessened.

From the foregoing it can be seen that there has been shown and described a method and apparatus for modifying the airflow normally occurring over an airfoil by directing a fluid stream across the airfoil in a direction generally transverse to normal airflow thereover, so as to entrain part of the air flowing thereover and to establish a locked vortex for preventing airflow separation and for causing reattachment of separated airflow. Since the location whereat airflow separation occurs on a particular airfoil depends on a number of factors, some of which are the airfoil configuration and overall dimensions, the maximum angle of attack at which the airfoil is to be operated under normal conditions, and the airspeed at which an aircraft so equipped is to be operated while airflow control according to the present invention is desired, the exact location of the orifices on the fuselage and/or relative to the airfoil surface necessarily is dependent upon the determination, for a particular aircraft, of where along the wing or other airfoil the airflow separation to be controlled normally occurs. Once this location is determined, then the airflow orifice or orifices should be situated such that the air blown therefrom and the entrained air, to the greatest extent practicable, cause a locked vortex to be established downstream of the airflow separation location. The amount of air entrainment and, accordingly, the degree of airflow control obtainable with the present invention is a function of the momentum of the airflow from the orifices. This orifice airflow, therefore, obviously is determined by other design criteria of a particular aircraft since, as stated above, many variables determine the entrainment requirements of an aircraft.

The embodiments of the present invention thus far described have utilized blowing in a direction generally away from the middle of an airfoil and toward the tips thereof. While it is believed that such an arrangement is preferable in many applications, blowing in the opposite direction, i.e., from an airfoil tip or tips toward an intermediate region of an airfoil, for example, the fuselage or inboard ends of the left and right segments of an aircraft wing, may also be employed to accomplish the results of the present invention. Airflow control of this type might be preferable, for example, in conjunction with a swept forward aircraft wing.

The techniques described herein are not limited to use with airfoils having the conventional configurations of wings, control members, and the like, but may be extended for application with an airflow surface generally where control of airflow separation is desired. For example, the fuselage configuration of some aircraft causes the airflow thereover to become separated at certain locations, thus producing unwanted air turbulence. A locked vortex established according to the present invention can cause reattachment of the separated airflow at such locations.

What is claimed is:

1. Apparatus for modifying the airflow across a surface of an airfoil to control airflow separation from such surface, comprising:
   fluid flow means disposed adjacent the airfoil for directing a fluid stream in a generally spanwise direction over the surface of the airfoil and at sufficient momentum to estabilsh a vortex extending in a generally spanwise direction along at least a portion of the airfoil surface; and
   a source of fluid pressure connected to supply fluid to said fluid flow means.

2. Apparatus as in claim 1 wherein said fluid flow means is positioned with respect to the airfoil surface to establish said vortex thereover at a location downstream of the regions of occurrence on the airfoil surface of airflow separation.

3. Apparatus as in claim 1, in which the airfoil for which vortex control is effected constitutes the wing of an aircraft, wherein:
   said fluid flow means comprises a first fluid outlet means operatively disposed adjacent one half of the aircraft wing and a second fluid outlet means operatively disposed adjacent the other half of the aircraft wing, each of said fluid outlet means being aligned to direct said fluid stream emitted therefrom along a surface of the respective wing halves in respective directions generally away from an intermediate location along the wing and toward the respective wing tips.

4. Apparatus as in claim 3, wherein each of said first and second fluid outlet means comprises at least one orifice means received in a respective half of the aircraft wing and in fluid communication with said wing surface each of said orifice means being aligned to direct said fluid stream emanating therefrom in a direction generally toward a respective wing tip,
   the position of each of said first and second fluid outlet means as determined along the chordwise dimension of the wing being selected to cause the fluid stream emanating therefrom to flow in a generally spanwise path downstream of the location on said wing surface whereat airflow separation occurs during selected flight conditions.

5. Apparatus as in claim 1, in which the airfoil for which airflow separation control is effected constitutes an aircraft control member which is selectively movable within a predetermined range of travel to establish desired airflow conditions thereover, further comprising:
   fluid flow control means operatively interrelated with the movable control member to direct said fluid stream over a selected surface of the control member when the control member is moved to a predetermined first position and to cause said fluid flow means to be inoperative with respect to said selected surface when the control member is moved to a selected second position different from said first position.

6. Apparatus as in claim 5, in which the control member has a first airflow surface and a second airflow surface and is selectively movable in a first direction and in a second direction relative to a neutral position, wherein:
   said fluid flow control means is operatively interrelated with the movable control member to direct said fluid stream over the first airflow surface only when the control member is moved to a position displaced in the first direction from the neutral position and to direct said fluid stream over the second airflow surface only when the control member is moved to a position displaced in the second direction from the neutral position.

7. A vehicle for use in airborne flight, said vehicle comprising:
   an airfoil having a surface from which airflow separation occurs during selected flight conditions;
   fluid flow means carried by the vehicle and disposed adjacent said airfoil surface; and
   a source of fluid pressure connected to said fluid flow means to establish a fluid stream emanating from said fluid flow means;
   said fluid flow means being directed with respect to said airfoil surface to blow said fluid stream across said surface in a generally spanwise direction at an angle relative to the direction of flight-related airflow thereacross which establishes a generally spanwise vortex along at least part of the airfoil surface.

8. The method of modifying airflow over a surface of an airfoil to control airflow separation from such surface, comprising:
   blowing a fluid stream in a generally spanwise direction along at least a portion of the airfoil surface to cause generation of a spanwise vortex extending generally parallel to a line of occurrence of airflow separation along at least a portion of the airfoil surface, so that the oncoming airflow across the airfoil surface flows over said spanwise vortex and then becomes reattached to the airfoil surface.

9. The method of claim 8, wherein said blown fluid stream is positioned to cause generation of said vortex downstream of said line of occurrences of airflow separation from said airfoil surface.

10. The method of claim 8, in which the airfoil has at least one tip region whereat airfoil movement through the air generates a tip vortex at the tip region and extending downstream from the airfoil, wherein:
    said step of blowing a fluid stream includes blowing from a location inwardly of the tip region along a path directed toward the tip region with sufficient fluid stream momentum to cause displacement of said tip vortex outwardly of the tip region.

11. The method of claim 8 in which the airfoil comprises a control member having first and second airflow surfaces and being selectively movable in a first direction and in a second direction relative to a neutral position, said method comprising:
    blowing said fluid stream across the first airflow surface in response to movement of the control member to a position displaced in the first direction from the neutral position; and
    blowing said fluid stream across the second airflow surface in response to movement of the control member to a position displaced in the second direction from the neutral position.

12. The method of claim 8, wherein the airfoil comprises an aircraft wing having a first half and a second half, and said step of blowing a fluid stream comprises the steps of:
    blowing a first fluid stream along the first wing half; and
    blowing a second fluid stream along the second wing half.

References Cited

UNITED STATES PATENTS

| | | | |
|---|---|---|---|
| 2,477,461 | 7/1949 | Lee | 244—40 |
| 2,894,703 | 7/1959 | Hazen et al. | 244—130 |

MILTON BUCHLER, Primary Examiner

JEFFREY L. FORMAN, Assistant Examiner

U.S. Cl. X.R.

244—42, 130